United States Patent [19]

Bohannon, Jr. et al.

[11] Patent Number: 4,622,092
[45] Date of Patent: Nov. 11, 1986

[54] APPARATUS FOR MAKING A BONDED SHEATH CABLE

[75] Inventors: William D. Bohannon, Jr., Lawrenceville; Herbert E. Brent, Lilburn; Alfred S. Hamilton, Norcross; Michael D. Kinard, Lawrenceville, all of Ga.

[73] Assignee: AT&T Technologies, Berkeley Heights, N.J.

[21] Appl. No.: 739,799

[22] Filed: May 31, 1985

Related U.S. Application Data

[62] Division of Ser. No. 626,079, Jun. 29, 1984, Pat. No. 4,563,540.

[51] Int. Cl.⁴ .................................... H01B 13/06
[52] U.S. Cl. ..................... 156/461; 156/48; 156/54; 156/56; 156/244.12; 156/443; 156/463; 156/500; 29/33 D; 29/33 E; 29/728; 29/872; 174/102 R; 174/106 D; 174/107; 264/272.11; 428/379
[58] Field of Search ............... 156/48, 54, 56, 244.12, 156/443, 461, 463, 500; 174/102, 106 D, 107; 29/33 D, 33 E, 728, 872; 264/272.11; 428/379

[56] References Cited

U.S. PATENT DOCUMENTS

| | | | |
|---|---|---|---|
| 2,090,744 | 8/1937 | Boe . | |
| 2,492,568 | 12/1949 | Gillis | 174/102 |
| 3,130,256 | 4/1964 | Mildner | 174/28 |
| 3,272,912 | 9/1966 | Jachimowicz | 174/107 |
| 3,420,720 | 1/1969 | Hillman | 156/53 |
| 3,574,016 | 4/1971 | Wahlberg | 156/54 |
| 3,575,748 | 4/1971 | Polizzano | 156/54 |
| 3,629,489 | 12/1971 | Jachimowicz et al. | 174/107 |
| 3,638,306 | 2/1972 | Pedowicz | 174/107 |
| 3,717,716 | 2/1973 | Biskeborn et al. | 174/25 R |
| 3,819,434 | 6/1974 | Dembiak et al. | 156/54 |
| 3,944,459 | 3/1976 | Skobel | 156/461 |
| 4,035,211 | 7/1977 | Bill et al. | 156/54 |
| 4,100,003 | 7/1978 | Trusch | 156/54 |
| 4,132,857 | 1/1979 | Scarola | 174/107 |
| 4,151,365 | 4/1979 | Hacker | 174/107 |
| 4,308,662 | 1/1982 | Bohannon | 29/828 |
| 4,360,395 | 11/1982 | Suzuki | 156/54 |
| 4,404,720 | 9/1983 | Bohannon | 156/54 |
| 4,439,632 | 3/1984 | Aloisio et al. | 174/106 D |
| 4,477,298 | 10/1984 | Bohannon et al. | 156/54 |
| 4,482,413 | 11/1984 | Bohannon et al. | 156/54 |
| 4,487,641 | 12/1984 | Bohannon et al. | 156/54 |

FOREIGN PATENT DOCUMENTS

2434646 1/1976 Fed. Rep. of Germany ...... 174/107

Primary Examiner—Caleb Weston
Attorney, Agent, or Firm—E. W. Somers

[57] ABSTRACT

A bonded ASP cable includes a multiconductor core which is filled with a waterproofing material. The core is enclosed by a plastic layer (28) which is flooded with a waterproofing material. Wrapped longitudinally about the plastic layer is a corrugated inner shield (31) having a longitudinal seam (35) and having an outer surface covered with a waterproofing material. The inner shield is enclosed by a corrugated outer shield (36) which has an overlapped longitudinal seam (38) and which has an outer surface coated with a layer of an adhesive material. As the outer shield is being formed, a sealant material is introduced into engagement with the inner shield in the vicinity of the longitudinal edge portions of the outer shield. Then as the longitudinal edge portions of the outer shield are overlapped and engaged with each other, the sealant material is caused to flow into cavities between the two shields adjacent to the seam of the outer shield to form a gasket (66). The gasket prevents the ingress of moisture, fills any cavities along which water otherwise could travel, and prevents the egress of waterproofing material through the seam of the outer shield. A plastic jacket (41) is bonded to the outer shield by the layer of adhesive material on its outer surface.

3 Claims, 17 Drawing Figures

Fig_1

Fig_2

Fig_17

APPARATUS FOR MAKING A BONDED SHEATH CABLE

This is a division of application Ser. No. 626,079, filed June 29, 1984, now U.S. Pat. No. 4,563,540.

TECHNICAL FIELD

This invention relates to apparatus for making a bonded sheath cable. More particularly it relates to apparatus for making a filled cable which includes a jacket that is bonded to a metallic shield which is formed with an overlapped sealed seam.

BACKGROUND

In order to preserve the transmission qualities of a communications cable, it becomes necessary to prevent the ingress of moisture into a multiconductor core of the cable. This may be accomplished by introducing a pressurized gas. In an increasingly popular technique, the cable core is filled with a waterproofing material after which a metallic shield having its major surfaces flooded with a wafterproofing material is wrapped about the core. The last-described technique produces what is referred to as a filled cable and avoids the necessity of pressurizing the cable.

For some filled cables, a dual metallic shield system is used. An inner shield which is made of a material having a relatively high electrical conductivity is used to dissipate stray electromagnetic currents and lightning, for example. Formed about the inner shield which may comprise aluminum, for example, is an outer shield which is made of a material such as steel having a relatively high modulus of elasticity. The outer shield provides suitable mechanical strength for the cable. Such a cable which also includes a plastic jacket is commonly referred to as an ASP cable.

It is not uncommon to bond the plastic outer jacket to the outer surface of the outer shield. By bonding the plastic jacket to the outer shield, which generally is corrugated, it has been found that the resistance of the cable to moisture diffusion is increased substantially. Further, if the jacket is not bonded to an adjacent shield, the pulling of the cable into an underground duct more often than not will cause a separation of the jacekt from the shield.

In the manufacture of a bonded sheath cable, a metallic tape such as a steel tape is precoated on one or both surfaces with a layer of an adhesive polymer material. Then the tape is wrapped about an inner shield which has been flooded with a waterproofing material and the core to form an outer shield having a longitudinal overlapped seam of which an overlying portion is directed inwardly toward the core. When a plastic jacket is extruded over the shielded core, the heat from the semimolten plastic material causes the adhesive layer on the outer surface of the outer shield to bond the jacket to the shield. This provides a laminate which reduces substantially the ingress of moisture into the core. Also, it provides mechanical strength to resist buckling, crushing and scuffing.

There also is a need to seal the longitudinal overlapped seam of the outer shield. This is necessary for several reasons. The sealing of the seam further reduces the probability of moisture ingress. Secondly, it prevents the escape of waterproofing material from the interface between the inner and outer shields to the external surface of the outer shield. Should any such material become deposited on the outer surface of the outer shield, bonding of the jacket to the shield is impaired. As a result, the jacket may exhibit irregularities or become easily separated from the outer shield when the cable is pulled into a duct. Further, a sealed seam is helpful in preventing the overlying edge portion of the outer shield from protruding into the jacket and weakening the plastic.

In the prior art, the sealing of the longitudinal seam has been accomplished in several ways. For example, inasmuch as longitudinal edge surfaces of the tape from which the outer shield is formed have been precoated with an adhesive material, heat of the extrusion causes a bonding of the overlapped longitudinal edge portion to occur. In another technique, the seam is formed, then opened and filled with a bead of adhesive material. See U.S. Pat. No. 4,035,211 which issued on July 12, 1977 in the names of R. G. Bill et al.

The above-mentioned techniques are not entirely satisfactory for sealing the longitudinal seam of a steel shield and for preventing water flow between the inner and outer shields. To reopen the seam after it has been formed may weaken the edge portions and the reclosing may not provide an altogether acceptable configuration. Further, the forming of the longitudinal seam of the steel shield with the overlying portion being directed inwardly results in cavities being formed between the inner and outer shields. These cavities are not filled with a waterproofing material inasmuch as limited quantities of that material are applied to the surfaces of the shields to avoid its escape through the seam. In fact, only enough waterproofing material is applied to the inner shield to fill the corrugations. The use of a precoated adhesive material or a bead in the seam is not sufficient to fill these cavities and eliminate potential conduits through which moisture may travel.

What is needed and what seemingly is not provided by the prior art is a bonded ASP cable having a reliably sealed overlapped seam in the outermost shield. The sealing of the seam should be such that any cavities between shields or between a single shield and adjacent portions of the cable are filled. Desirably, the sealing is accomplished in a manner which does not require a restructuring of the seam.

SUMMARY OF THE INVENTION

The foregoing problems have been overcome by the apparatus of this invention for making a bonded sheath cable. The bonded sheath cable comprises a core which is filled substantially with a waterproofing material and which includes at least one conductor. A layer of plastic material encloses the core and a metallic shield encloses the layer of plastic material. The shield is wrapped about the layer of plastic material to have a longitudinal overlapped seam and to form at least one cavity between the shield and the layer of plastic material. An outer surface of the shield is coated with an adhesive material which bonds a subsequently extruded plastic jacket to the shield. The cable also includes a gasket which is made of a thermoplastic sealant material and which is disposed within and adjacent to the longitudinal seam of the metallic shield in engagement with inner and outer surfaces of the shield. The gasket extends from the seam in a direction along the periphery of the layer of plastic material and between the shield and the layer of plastic material to fill the at least one cavity. This prevents the egress of the waterproofing material through the seam and the ingress of moisture.

In a preferred embodiment, the cable includes a core wrap which is made of a plastic material and an inner shield which comprises a metallic material having a relatively high conductivity. A waterproofing material is interposed between the core wrap and the inner shield. The inner shield has a longitudinal overlapped seam and is flooded along an outer surface with a waterproofing material. Enclosing the inner metallic shield is an outer metallic shield. It is formed to have a longitudinal overlapped seam and is made of a metallic material having a relatively high modulus of elasticity. An outer surface of the outer shield is coated with an adhesive material which causes the outer shield to become bonded to the jacket.

In making the bonded sheath cable, a core comprising at least one conductor is advanced along a manufacturing line and is filled substantially with a waterproofing material. The filled core is wrapped with a plastic core wrap material and a corrugated metallic tape that forms an inner shield which in a preferred embodiment has an overlapped longitudinal seam. In the preferred embodiment, both major surfaces of the core wrap are flooded sufficiently with a waterproofing material prior to the forming of the inner shield to fill the corrugations of the inner surface of the inner shield. An outer surface of the inner shield is flooded with a waterproofing material. Then a second tape, which is made of a metallic material having a relatively high modulus of elasticity is wrapped about the inner shield to form a longitudinal overlapped seam. Because of its mechanical properties, the outer shield does not conform to the inner shield in the vicinity of the seam. This results in the formation of cavities extending longitudinally of the cable between the inner and the outer shields. Provisions mst be made for filling these cavities. As the seam is formed in the outer shield, a thermoplastic sealant material is injected into engagement with the inner shield. The amount injected is sufficient so that as the seam is formed, the sealant material forms a gasket which fills any cavities between the outer and inner shields in the vicinity of the seam and is disposed about and between the edge portions which form the seam. The material of the gasket has adhesive qualities to cause the gasket to remain adhered to the shields during flexing of the cable. Subsequently, a plastic jacket is extruded about the outer shield and becomes bonded thereto by an adhesive material which has been precoated over the outer surface of the outer shield.

In a preferred embodiment, the sealant material is introduced through an opening in a tool which is used to form the seam. The injection is accomplished in a manner which does not displace any of the waterproofing material disposed on the adjacent outer surface of the inner shield.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION

Figure 1:
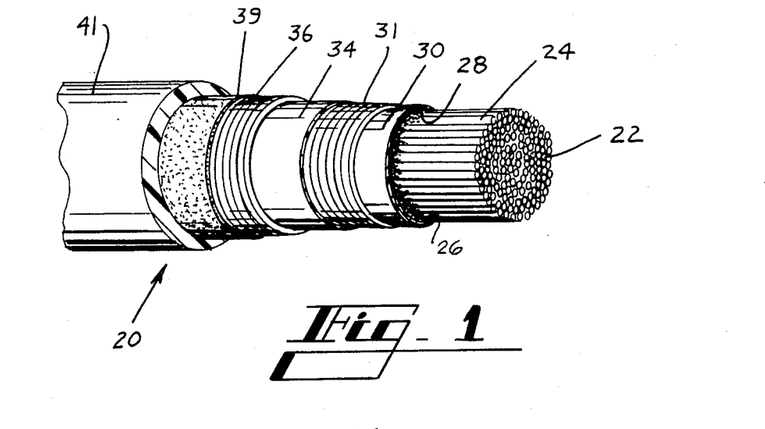
FIG. 1 is a perspective view of a cable made with the apparatus of of this invention.
Figure 2:
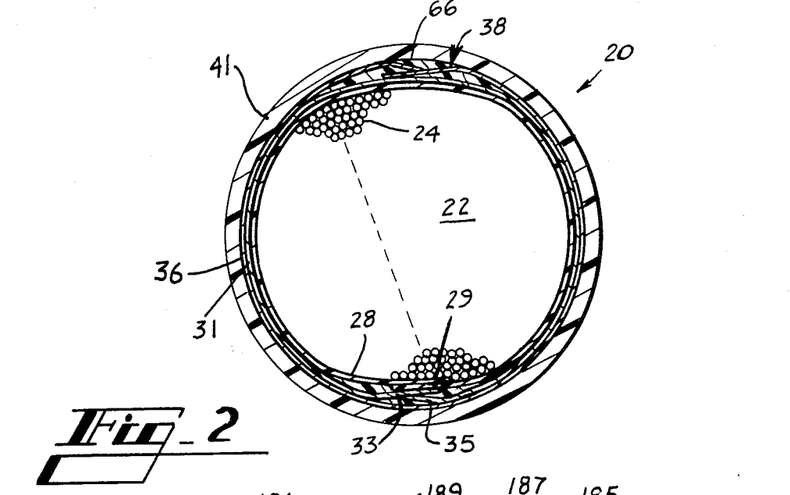
FIG. 2 is an end view in section of the cable of FIG. 1.

Referring now to FIGS. 1 and 2 there is shown a cable which is designated generally by the numeral 20 and which is made with the apparatus of this invention. The cable 20 includes a core 22 which comprises a plurality of individually insulated conductors 24—24. In order to protect the cable from moisture, the interstices of the core are filled with a waterproofing material 26. The waterproofing material may be Flexgel TM filling compound, for example, disclosed in U.S. Pat. No. 4,176,240 which issued on Nov. 27, 1979 to R. Sabia and which is incorporated by reference hereinto. Flexgel is a trademark of AT&T Technologies, Inc.

The core 22 is enclosed by a plurality of coverings beginning with a core wrap 28 which is made of a plastic material such as Mylar ® plastic. The core wrap 28 is wrapped longitudinally about the core with an overlapped seam 29. In order to eliminate pockets in which moisture may collect, each major surface of the core wrap 28 in a preferred embodiment is flooded with a layer 30 (see FIG. 1) of the Flexgel filling compound which is used to fill the core 22. For purposes of clarity, the flooded layers of waterproofing material are not shown in FIG. 2.

Over the core wrap 28 is applied a metallic inner shield 31. Preferably, the inner shield 31, which is used to dissipate stray currents and to provide protection from lightning, is made from a corrugated aluminum tape. The corrugations on an outer surface 33 of the inner shield 31 are filled, preferably with a layer 34 of an atactic polypropylene material which is a byproduct of the manufacture of crystalline polypropylene. The inner shield 31 is wrapped about the core wrap 28 with a longitudinal overlapped seam 35. Inasmuch as the outer surface of the core wrap 28 is flooded with a waterproofing material, the corrugations on the inner surface of the shield 31 become filled substantially with that material.

The overlapped seam 35 of the inner shield provides several functions. It provides more effective shielding than a non-overlapped seam, it avoids the forming of a gap along which water can travel, and it facilitates the introduction of waterproofing material between the edge portions. Although the overlapped seam is preferred, there may be instances where an open or butted longitudinal seam could be used.

Covering the inner shield 31 is a metallic outer shield 36 which provides mechanical strength for the cable 20. The outer shield 36 which is corrugated and which is made of a metallic material having a relatively high modulus of elasticity has a longitudinal overlapped seam 38. Further, at least the outer surface of the outer shield 36 is coated with a layer 39 (see also FIG. 3) of adhesive material such as, for example, an acrylic acid copolymer material. This layer of adhesive material is used to cause a subsequently applied jacket 41 to become bonded to the outer shield. In a preferred embodiment shown in FIGS. 4 and 5, the outer shield 36 is coated with a system which includes a first layer 43 comprising an adhesive material and a second layer 44 comprising a polymer material. The first layer of material is one which bonds suitably to the metallic outer shield and to the material of the second layer whereas the second layer is one which bonds suitably to the plastic material of the jacket 41. Such a system is disclosed in U.S. Pat. No. 4,132,857 which issued on Jan. 2, 1979 in the names of L. Scarola et al.

Figure 3:
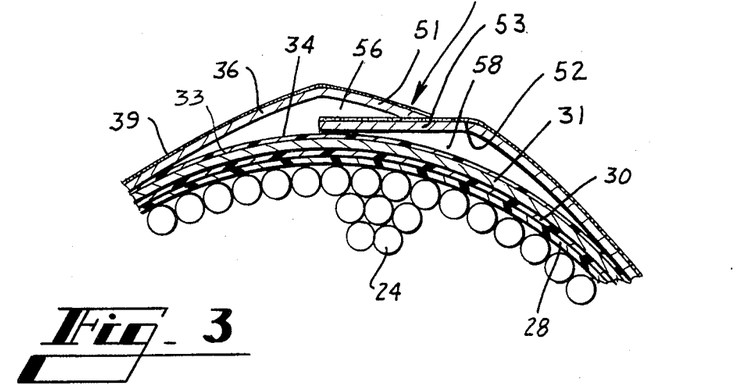
FIG. 3 is a detail view of a cable to show cavities formed between inner and outer shields.

As can be seen in FIG. 3, the overlapped seam 38 of the outer shield 36 is formed specially with a overlying downturned edge portion 51. The downturned edge portion 51 engages an outer surface 52 of an underlying longitudinal edge portion 53 of the outer shield 36 and is formed in accordance with methods and apparatus which are disclosed and claimed in U.S. Pat. No. 4,308,662 which issued on Jan. 5, 1982 in the name of W. D. Bohannon, Jr. Because it is downturned, the edge portion 51 does not protrude outwardly from the core 22 and into the jacket plastic. Also, it should be observed from FIG. 2 that the overlapped seam 38 of the outer shield 36 is displaced from the overlapped seam 35 of the inner shield 31 in a direction circumferentially of the core.

The outer shield 36 which has higher strength properties than the inner shield 31 does not conform to the contour of the inner shield in the vicinity of the seam 38. As a result, cavities 56 and 58 (see FIG. 3) are formed between the outer shield and the inner shield. These cavities which extend longitudinally of the cable 20 provide paths along which moisture can travel. To protect the cable core from moisture, these cavities must be filled with a waterproofing material. The waterproofing material with which the outer surface of the inner shield 31 is flooded is not of sufficient quantity to fill the cavities 56 and 58. Any filling arrangement must be such that filling material does not flow through the seam 38 and coat the outer surface of the outer shield 36. If it did, the bond, if any, between the jacket 41 and the outer shield 36 would be insufficient to prevent separation of the jacket from the outer shield during pull-in operations in the field. Also, the presence of waterproofing material on the outer surface of the outer shield 36 could result in irregularities in the jacket 41.

The above-described problem is overcome by filling the cavities 56 and 58 with a waterproofing sealant material which has suitable adhesive qualities to bond together the overlapping edge portions 51 and 53 of the outer shield. Further, the waterproofing material must adhere to portions of the shields which define the cavities 56 and 58 to avoid separation when the cable is flexed. In a preferred embodiment, the waterproofing material is a thermoplastic sealant material such as one designated 72-6828 and marketed by the National Starch Company. It is commonly referred to as a hot melt sealant material, is applied in a molten state, and exhibits adhesive qualities when it cools. It is highly viscous and adheres to the steel outer shield 36, albeit oily. Further, it has relatively good low temperature properties and impact resistance.

Figure 4:
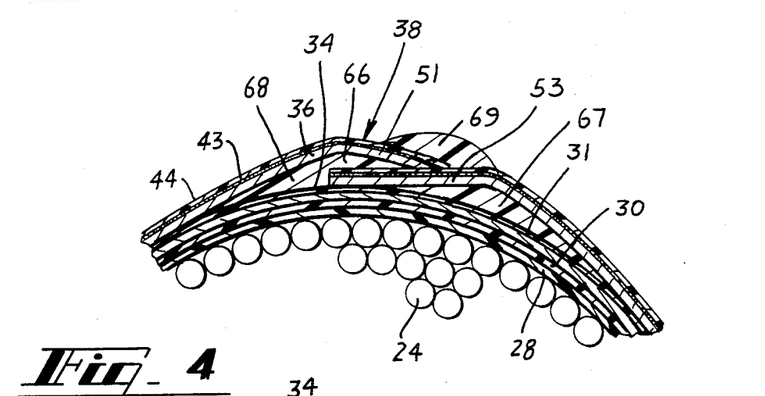
FIG. 4 is a detail view of the seam of the outer shield prior to a jacket being formed thereon but with a gasket comprised of sealant material disposed about the seam.

The cable 20 is formed so that the waterproofing material forms a gasket designated by the numeral 66. As seen in FIG. 4, the gasket 66 includes a portion 67 which extends beneath the underlying edge portion of the seam of the outer shield 36 for a distance in a direction circumferentially of the core 22. It also includes a portion 68 which extends in an opposite circumferential direction beneath the overlying edge portion of the outer shield. These tail portions 67 and 68 extend to points which insure that the cavities between the two shields in the vicinity of the seam 38 are filled substantially. Also, a portion of the sealant material is disposed between the overlapping edge portions of the outer shield 36 and bonds together those edge portions.

The gasket 66 provides several functions. First, it prevents the flow of waterproofing material from within the cable 20 onto the outer surface of the outer shield 36, thereby preventing degradation of the bond between the outer shield and the jacket 41. Secondly, it prevents the flow of moisture longitudinally of the cable by filling cavities formed by the non-conformance of the relatively rigid outer shield 36 to the more flexible inner shield 31. Further, by sealing the seam, it prevents notching of the jacket plastic and reduces substantially the ingress of moisture from the environment into the core 22.

Because of the manner in which the sealant material is introduced during the forming of the seam 38, a bead 69 (see FIG. 4) is formed along the outside of the seam. More specifically, the bead 69 of the sealant material is formed to extend along the seam 38 in a step formed by the intersection of the longitudinal edge surface of the overlying edge portion 51 of the outer shield 36 and the outer surface 52 of the underlying edge portion 53. Inasmuch as the bead 69 occupies the space of the step, it has little effect on the bonding of the outer shield to the jacket. The application of plastic material to the outer shield 36 to form the jacket 41 causes the bead 69 to become reconfigured and to assume the shape shown in FIG. 5.

Figure 6:
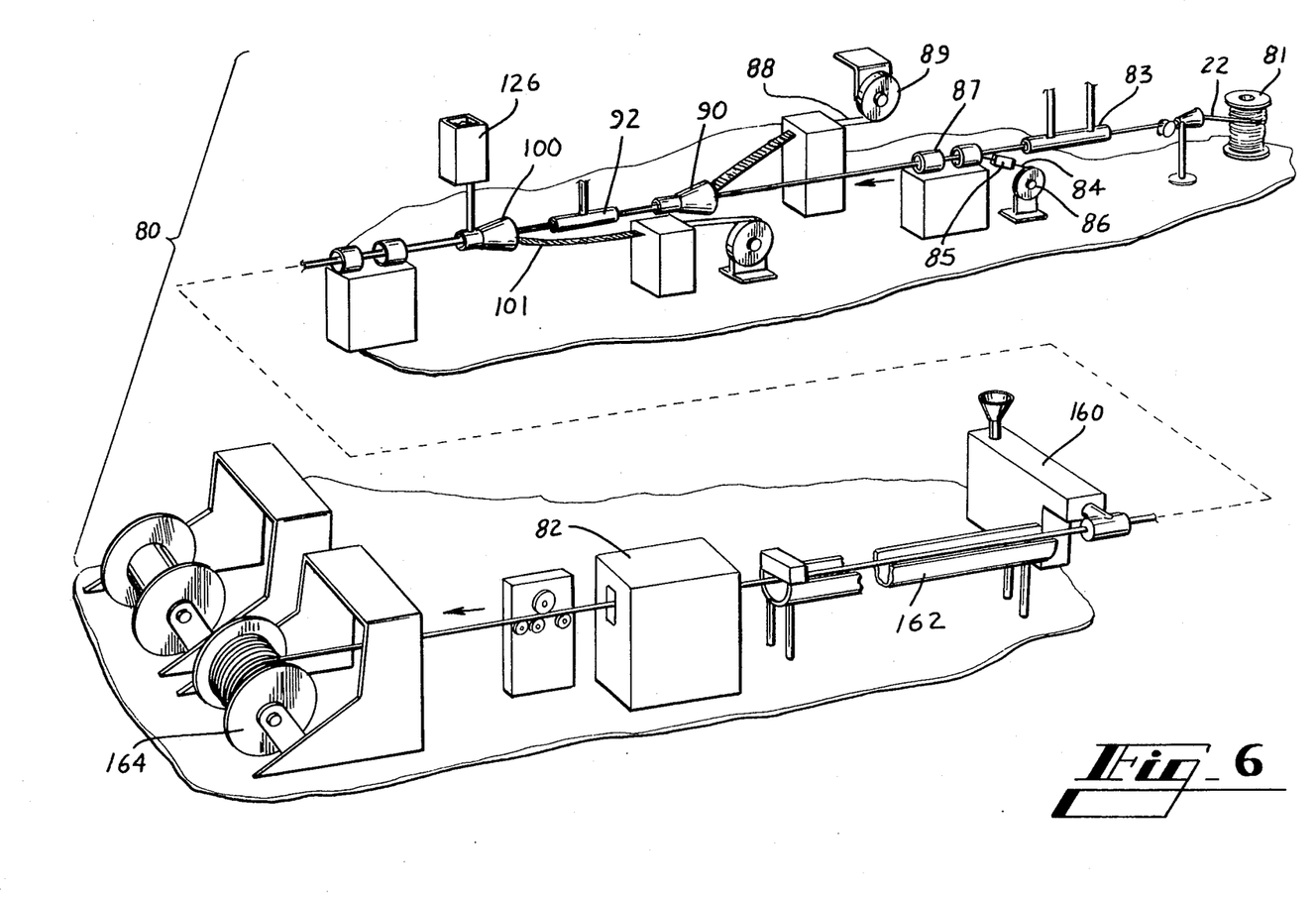
FIG. 6 is a perspective view of a manufacturing line for making the cable of FIG. 1.

Going now to FIG. 6, there is shown a schematic view of apparatus designated generally by the numeral 80 for making the cable 20. The apparatus includes a supply reel 81 of the core 22 which is caused to be advanced by a capstan 82 through a filling chamber 83 which is used to fill the interstices of the core with a waterproofing material such as the Flexgel filling material. The filled core 22 is wrapped with a strip 84 of plastic material such as the Mylar plastic which is advanced from a supply 86. Before the plastic strip 84 is formed into the core wrap, a device 85 causes both major surfaces to be flooded with a waterproofing material such as, for example, the Flexgel filling material.

Afterwards, the core wrap is secured about the core 22 with a ribbon binder 87.

A strip 88 of aluminum is advanced from a supply 89, corrugated and formed into the tubular inner shield 31 about the wrapped core. The strip 88 of aluminum may be undercoated or it may be precoated with an acrylic acid copolymer or other suitable protective material. The shield 31 is formed by a device 90 to have the longitudinal overlapped seam 35. As the strip 88 is formed into the shield 31, the corrugations on the inner surface thereof become filled with the waterproofing material with which the core wrap had been flooded. Then the shielded core 22 is moved through a chamber 92 which causes a layer of waterproofing material such as atactic polypropylene to be applied over the outer surface of the inner shield 31. An atactic polypropylene is used because of its relatively high melting point compared to that of the Flexgel material. This becomes important during the extrusion of the jacket material in that it resists melting and unwanted displacement from the heat of extrusion.

The shielded core is moved through an apparatus 100 such as that disclosed and claimed in U.S. Pat. No. 4,404,720 which issued on Sept. 20, 1983 in the name of W. D. Bohannon, Jr. and which is incorporated by reference hereinto. Therein, a corrugated strip 101 of steel is formed into the outer shield 36 about the shielded core. This is done in a manner to cause the overlying edge portion 51 of the outer shield to be turned inwardly toward the longitudinal axis of the core and into engagement with the outer surface 52 of the outer shield.

Figure 7:
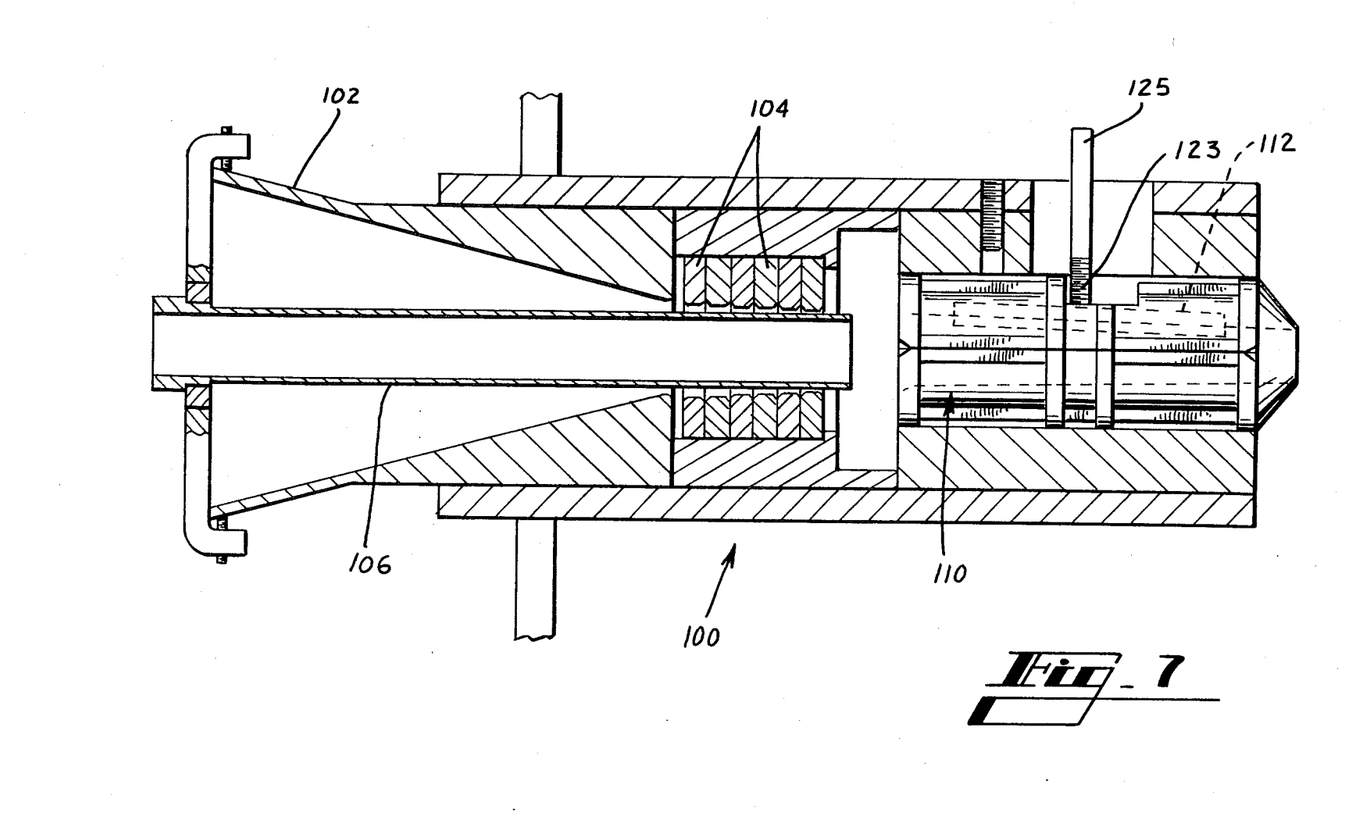
FIG. 7 is a perspective view of apparatus which is used to form the outer shield about an already shielded core.

The apparatus 100 which is used to form the steel strip 101 into the outer shield 36 is shown in FIG. 7. It includes a conically shaped portion 102 and a plurality of plates 104—104 having progressively decreasing openings to cause the steel strip to become partially tubular about a centrally disposed guide tube 106.

Figure 5:
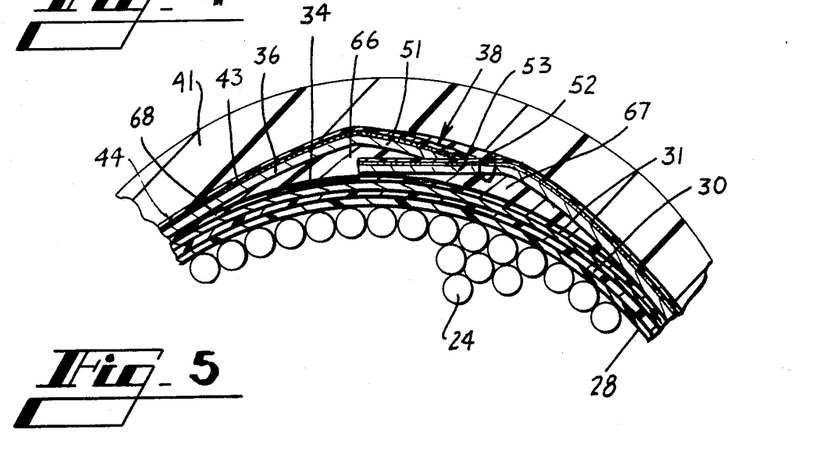
FIG. 5 is a detail view of a seam of the outer shield of the cable of FIG. 1 after the jacket has been applied.
Figures 8, 10, 11:
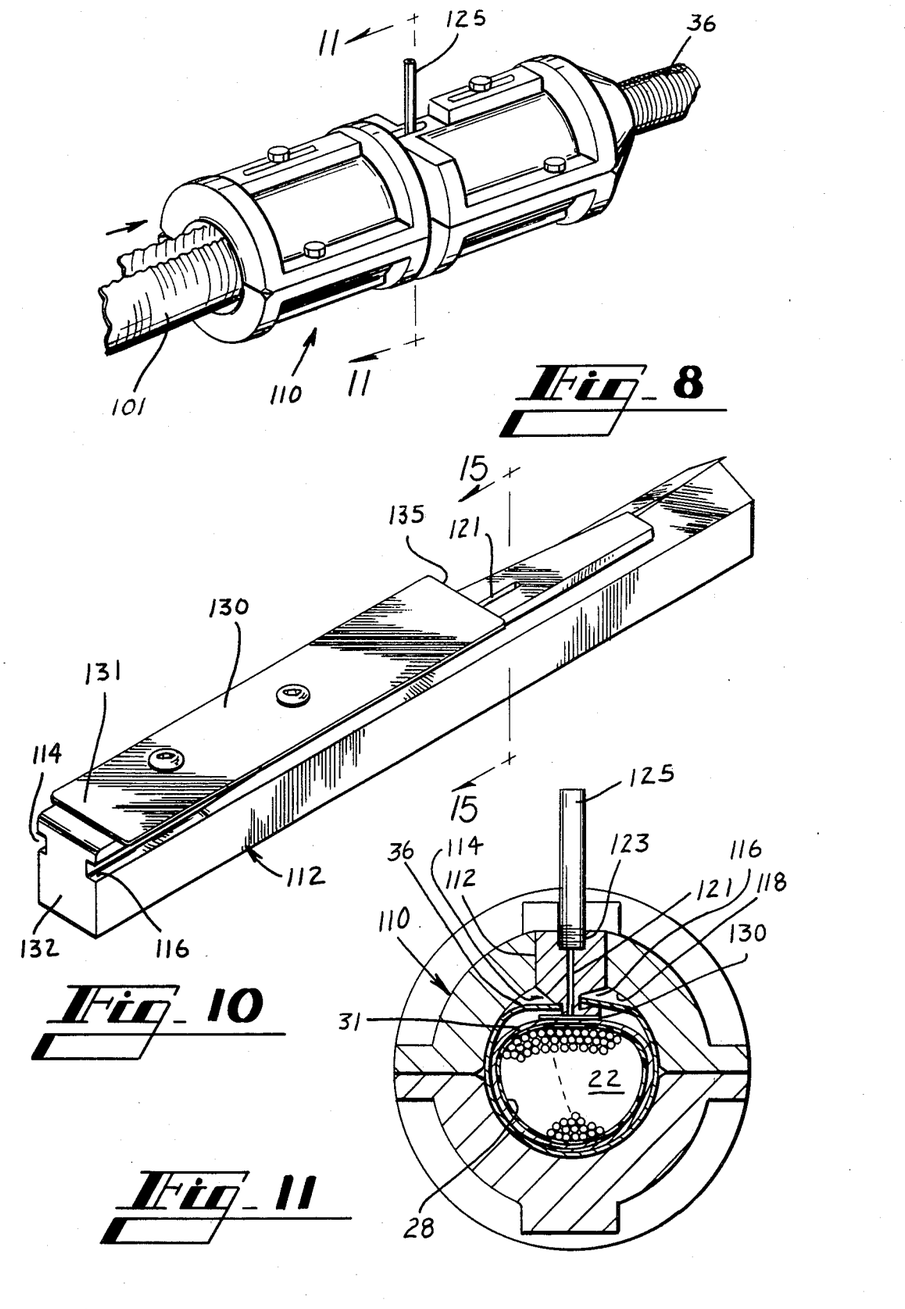
FIG. 8 is a perspective view of tooling used to form the seam of the outer shield.
FIG. 10 is a perspective view of a portion of the tooling of FIG. 9.
FIG. 11 is an end section view of the tooling of FIG. 8 to show a passageway through which a sealant material is moved.
Figure 9:
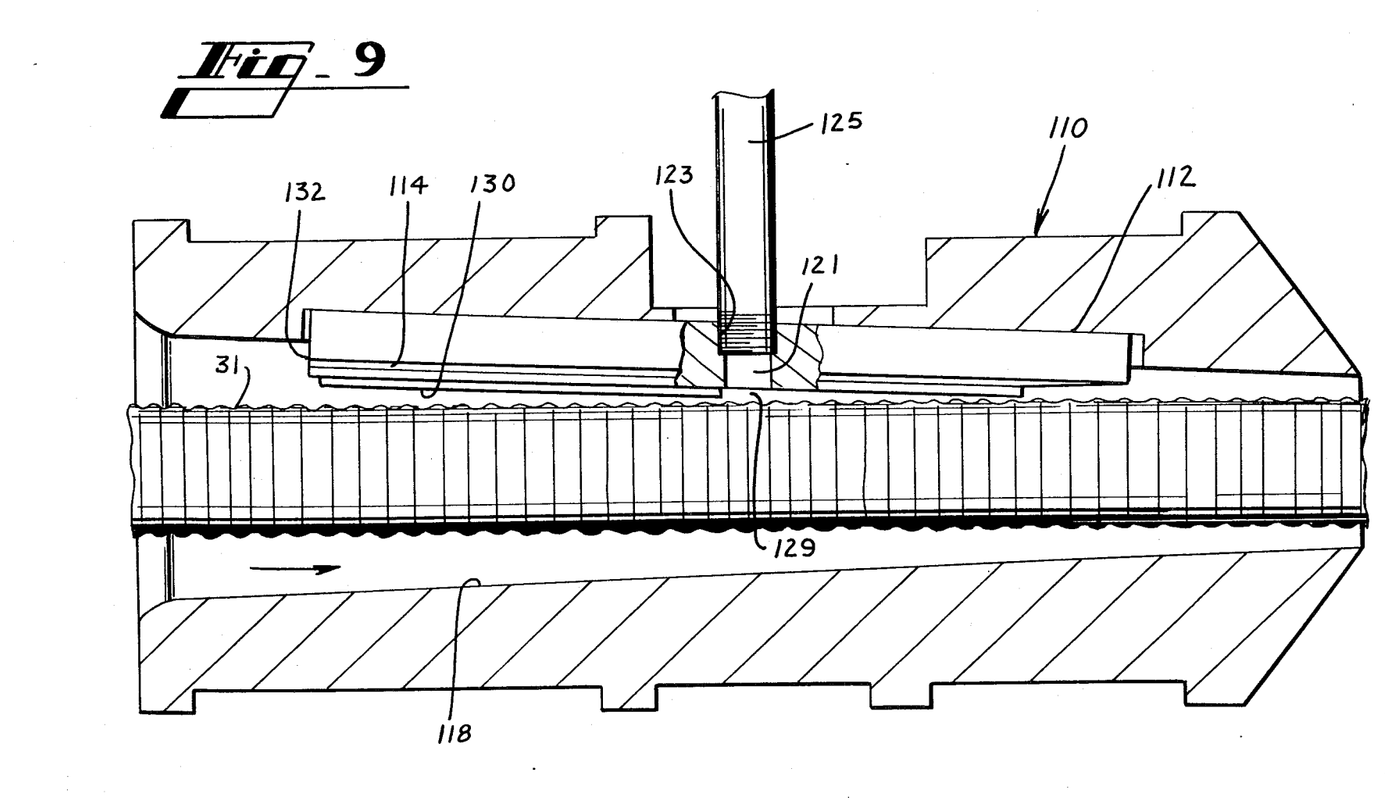
FIG. 9 is an elevational view in section of the tooling shown in FIG. 8.

Afterwards, the partially formed steel strip is moved through a tool designated generally by the numeral 110 (see FIGS. 7-9). Portions of the tool 100 used to guide the longitudinal edge portions 51 and 53 of the steel strip 101 cause them to be formed into the configuration shown in FIG. 5. As such, the tool 110 includes a key 112 (see FIG. 10) which includes guideways 114 and 116. The longitudinal edge portions of the partially formed steel strip are moved along the guideways 114 and 116 which in accordance with the priorly mentioned Bohannon, Jr. U.S. Pat. No. 4,404,720 causes them to be formed into an overlapping relationship as shown in FIG. 5. As shown in FIG. 11, as the longitudinal edges are being formed, portions of the steel strip are in engagement with a tapering conical surface 118 of the tool 110.

The tool 110 also includes provisions for introducing the sealant material into engagement with portions of the cable as the seam 38 of the outer shield is being formed. As seen in FIGS. 9-11, the tool 110 includes a slot 121 which extends from an outer portion thereof inwardly toward the core. The slot 121 is connected to an opening 123 which is connected through a conduit 125 to a source 126 (see FIG. 6) of the sealant material.

Also, the tool 100 is provided with a deflector plate 130 (see FIGS. 9-11) which is adjacent to the inner shield 31. The deflector plate 130 is effective to apply forces to the inner shield 31, urging it toward the core 22 and creating a void 129 into which the sealant material is introduced. As can be seen in FIG. 10, the deflector plate 130 extends from its end 131 adjacent an end 132 of the key 112 to an end 135 just before the slot 121. As the sealant material is flowed out of the slot 121 (see FIG. 12), it is directed radially into engagement with the inner shield 31. This may cause the sealant material to be divided into two streams 133 and 134 which are diverted in opposite directions circumferentially of the core 22. Then as the longitudinal edge portions of the steel strip 101 are brought into overlapping relation with each other, the sealant material is compressed between them and the inner shield 31. This causes the material to flow circumferentially and to fill the cavities 56 and 58 formed between the two shields. Also, as can be seen in FIG. 12, a portion 136 of the sealant flows longitudinally in the direction of advance of the cable core 22.

The flow circumferentially of the core to form the two tail portions 67 and 68 of the gasket 66 is controlled to end within a relatively short distance from the seam 38. It will be recalled that the corrugations of the inner shield 31 had been prefilled with a waterproofing material. Also, beyond the vicinity of the seam 38, the outer shield 36 conforms generally to the contour of the inner shield 31. As a result, the flow path for the sealant material decreases in size as the material flows away from the seam 38. Further, because the waterproofing material already in place on the outer surface of the inner shield is at a temperature of about 220° F., the sealant material, which is at a temperature of about 350° F., is caused to set up as it travels circumferentially in contact with the cooler material on the inner shield.

The flow of the adhesive material is controlled to provide a visual indication that the seam has been sealed and that the cavities 56 and 58 have been filled. The flow is controlled relative to the velocity of the cable core 22 so that after the sealing and filling, the relatively small bead 69 of the adhesive material is formed longitudinally of the cable. As seen in FIG. 4, the bead is formed in the step between the outer surface of the outer shield 36 and the longitudinal edge surface of the overlying edge portion 51 of the outer shield. This bead is an indication to an operator that the forming of the gasket 66 is being suitably accomplished.

Figures 12, 13, 14, 15, 16:
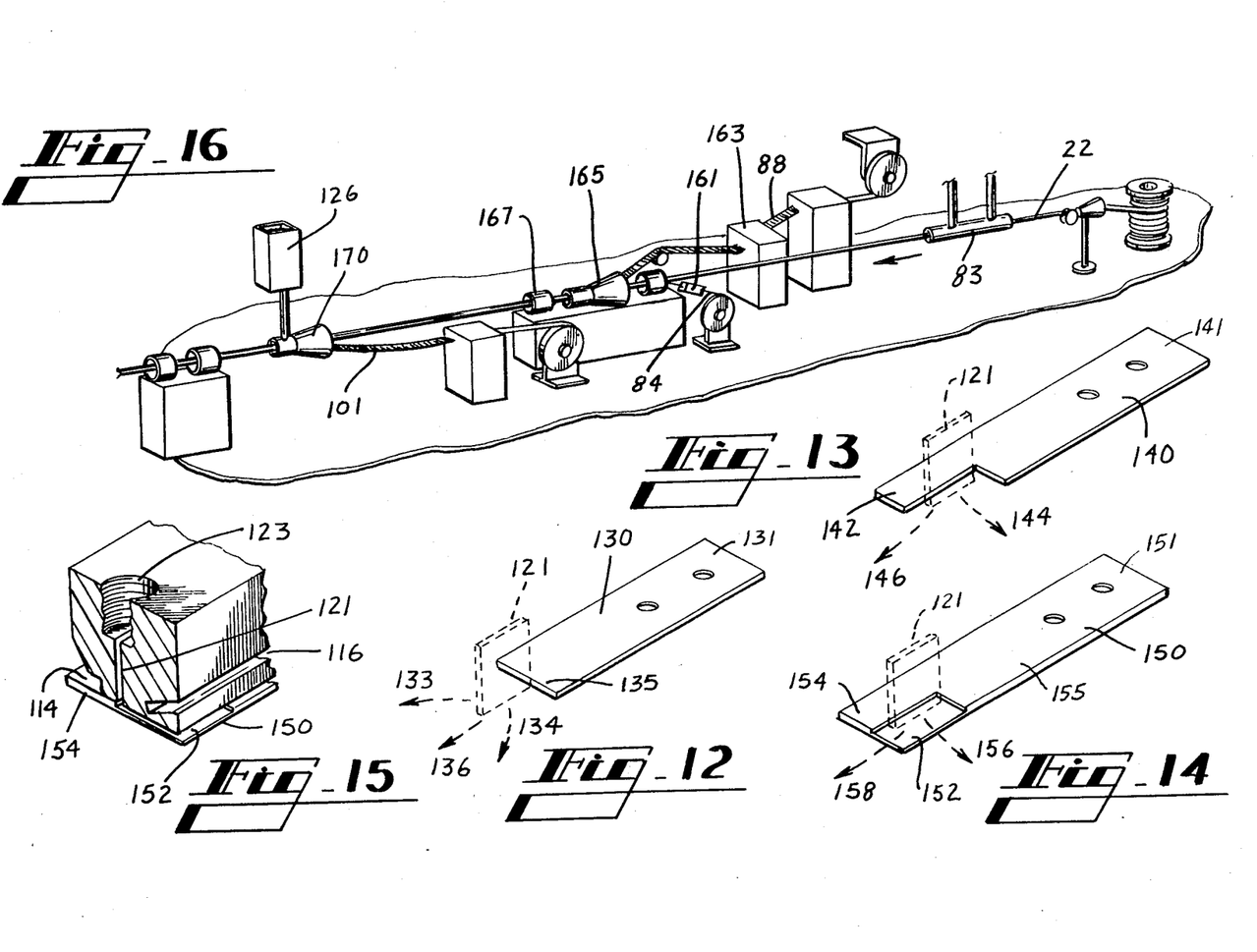
FIGS. 12-13 are view which show deflection plates which are used at the point of introduction of the sealant material.
FIG. 14 is a perspective view of a preferred embodiment of a deflector plate.
FIG. 15 is a perspective view of a portion of the tooling of FIG. 10 with the deflector plate of FIG. 14.
FIG. 16 is a perspective view of an alternate embodiment of a manufacturing line for making a bonded sheath cable.

In FIG. 13 there is shown an alternative embodiment 140 of a deflector plate. This embodiment includes a portion 141 adjacent to the end 132 of the key 112 and a portion 142 which extends past the slot 121. The extension 142 is effective to prevent the flow through the slot 121 from dividing into two circumferential streams. Instead the sealant material flows circumferentially in one stream 144 and longitudinally in a stream 146 in the direction of advance of the core 22. However, as the edge portions 51 and 53 are closed, the sealant material becomes redistributed on both sides of the seam 38 to form the gasket 66.

In FIG. 14, there is shown a preferred embodiment 150 of a deflector plate. It includes a portion 151 adjacent to the end 132 of the key 112 and a stepped portion 152 formed between an extension 154 and main body portion 155 (see also FIG. 15). As a result, as the sealant material is flowed through the slot 121, it does not flow radially into engagement with the inner shield 31 and its covering of atactic polypropylene. Instead it divides into two components 156 and 158 to fill the cavity 56 and ultimately be formed into the gasket 66. The avoidance of radial flow into engagement with the inner shield 31 prevents the sealant material from causing the atactic polypropylene to be removed from the outer surface of the inner shield.

Afterwards, the shielded cable core is advanced through an extruder 160 which causes a plastic material such as linear low density polyethylene to be applied over the outer shield 36 to form the jacket 41. As will be recalled, the outer surface of the outer shield 36 had been precoated with a suitable adhesive material. This causes the plastic material which forms the jacket 41 to become bonded to the outer shield 36. The forming of the jacket 41 also causes the bead 69 of sealant material to become shaped as shown in FIG. 5. Then the jacket plastic is cooled in a trough 162 and taken up on a reel 164.

In the preferred embodiment, both major surfaces of the core wrap material are controllably flooded with the Flexgel filling compound before it is wrapped about the core. Also, the outer surface of the inner shield 31 is flooded with a different material, such as an atactic polypropylene. In another embodiment, which is made by apparatus shown in FIG. 16, the portions of the strip 84 of core wrap material which are to form the overlapping seam 29 may be flooded with the Flexgel filling compounds, for example, by a filling chamber 161. Both major surfaces of the tape 88 which is to form the inner shield 31 are flooded in a chamber 163 with the atactic polypropylene material. Afterwards, a device 165 causes the flooded tape 88 to be wrapped about the core wrap with the flooding material on its inner surface adapted to conform to the core wrap. Then, the shielded core is bound by a device 167 and advanced through apparatus 170 similar to the apparatus 100 in which the steel outer shield 36 is formed about the inner shield 31. The waterproofing material on the outer surface of the inner shield 31 engages portions of the inner surface of the outer shield 36 and the sealant material forms the gasket 66.

Figure 17:
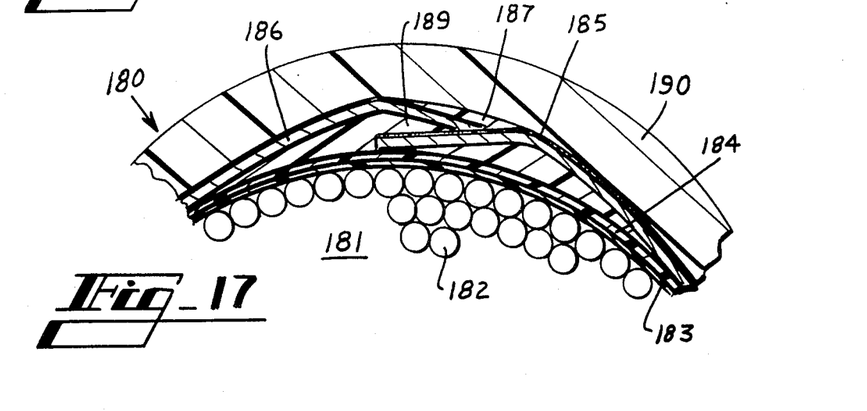
FIG. 17 is an end view of a bonded sheath cable which includes a single shield.

Although the preferred embodiment has been described in terms of the conventional ASP structure, this invention may be used to provide a gasket for a single shielded cable. For example, shown in FIG. 17 is a cable 180 which includes a core 181 comprising a plurality of individually insulated conductors 182—182. As before, the core 181 is wrapped in a core wrap 183 comprising the Mylar plastic material which has been coated on at least an outer side with a waterproofing material 184. A strip of metallic material which has been precoated at least on its outer surface with an adhesive material 185 is wrapped about the core to form a shield 186 having a longitudinal overlapped seam 187.

As was seen in FIG. 3, the forming of the shield 186 may cause longitudinally extending cavities to be formed adjacent to the seam 187. These cavities are filled with a gasket 189 comprising a thermoplastic sealant material which is introduced into the seam as it is being formed. The circumferential flow of the molten sealant material is arrested by the relatively cool waterproofing material already in place and the increasingly restrictive space between the shield and the core wrap material. A bead of the sealant material formed in the step of the shield seam provides a visual indication that the cavities and the overlapped seam have been filled. Afterwards a jacket 190 of plastic material is extruded over the shield 186. Because of the precoating 185 of adhesive material on the outer surface of the shield 186, the jacket material is bonded to that surface.

It is to be understood that the above-described arrangements are simply illustrative of the invention. Other arrangements may be devised by those skilled in the art which will embody the principles of the invention and fall within the spirit and scope thereof.

What is claimed is:

1. An apparatus for making a bonded sheath, filled cable, said apparatus comprising:

means for advancing a cable core filled with a waterproofing material;

means for enclosing the core in a strip of plastic material;

forming means for causing a metallic tape having a surface thereof coated with an adhesive material to be wrapped about the strip of plastic material to form a shield having a longitudinal overlapped seam which includes overlying and underlying edge portions and having the adhesive material facing outwardly with the underlying edge portion being directed generally inwardly and with the overlying edge portion being directed generally inwardly into engagement with the underlying edge portion;

means for causing a waterproofing material to be disposed between said strips of plastic material and said shield;

means for introducing a sealant material into the vicinity of the longitudinal edge portions of the tape as they are being overlapped to cause the sealant material to seal said overlapped seam and to cause the sealant material to flow circumferentially of said core to fill any cavities between said shield and said strip of plastic material in the vicinity of said seam; and means for extruding a jacket of plastic material about said shield and for causing said jacket to be bonded by said adhesive material to said shield.

2. The apparatus of claim 1, wherein said forming means is a first means for wrapping a tape about the core to form an outer shield and said apparatus also includes means for causing another tape to be wrapped about the core to form an inner shield prior to the forming of the outer shield, means for flooding an outer surface of the inner shield with a waterproofing material, and wherein the sealant material is introduced into engagement with an outer surface of the inner shield as the longitudinal edge portions of the outer shield are being formed.

3. The apparatus of claim 2, wherein said means for causing the sealant material to flow circumferentially includes means for directing the sealant material radially of the core toward the inner shield and then deflecting the sealant material to flow circumferentially of the core in at least one direction prior to its engagement with the inner shield.

* * * * *